US006479152B1

(12) United States Patent
Miyauchi et al.

(10) Patent No.: US 6,479,152 B1
(45) Date of Patent: Nov. 12, 2002

(54) LUBRICATIVE STAINLESS STEEL SHEETS AND PIPES AND METHOD OF PRODUCING LUBRICATIVE STAINLESS STEEL PIPES

(75) Inventors: Yujiro Miyauchi, Kimitsu (JP); Itsuro Hiroshige, Tokai (JP); Isao Anai, Tokai (JP); Katsuhiko Kato, Kitakyushu (JP); Toshio Tanoue, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 09/710,337

(22) Filed: Nov. 9, 2000

(30) Foreign Application Priority Data

Nov. 12, 1999 (JP) .......................................... 11-323127

(51) Int. Cl.[7] .......................... B32B 15/08; B32B 27/38

(52) U.S. Cl. ....................... 428/418; 428/621; 428/667; 428/586; 428/425.8; 428/35.9; 428/36.91; 525/107; 525/131

(58) Field of Search ................................ 428/626, 667, 428/418, 425.8, 35.9, 36.91, 621; 525/107, 131

(56) References Cited

U.S. PATENT DOCUMENTS 4,796,797 A * 1/1989 Nakako et al. ............. 228/144

FOREIGN PATENT DOCUMENTS

| | | | | |
|---|---|---|---|---|
| JP | 6-264255 | | 9/1994 | |
| JP | 8-41652 | | 2/1996 | |
| JP | 8-290109 | A * | 11/1996 | ............ B05D/7/14 |
| JP | 408290109 | A * | 11/1996 | ............ B05D/7/14 |
| JP | 2719571 | | 11/1997 | |
| JP | 2719571 | B2 * | 2/1998 | ......... C09D/163/00 |
| JP | 2743237 | | 2/1998 | |
| JP | 10-137863 | | 5/1998 | |
| JP | 10137863 | A * | 5/1998 | ........... B21D/26/02 |

* cited by examiner

*Primary Examiner*—James J. Seidleck
*Assistant Examiner*—Melanie Bissett
(74) *Attorney, Agent, or Firm*—Kenyon & Kenyon

(57) ABSTRACT

Lubricative stainless steel sheet and pipe having a chromate film on at least one of the surfaces of a stainless steel sheet or pipe substrate, the chromate film having an amount of adhered Cr of 5 to 100 mg/m$^2$, and, on the chromate film, a lubricant film obtained by applying, on the chromate film, a water-base coating containing (a) a urethane resin of ether-ester type having a skeleton of bisphenol type, a skeleton of ester, and a carboxyl group, (b) an epoxy resin, and (c) a polyolefin wax, and baking the applied coating, the sum of the amount of the urethane resin of (a) and the epoxy resin of (b) being 70 to 95% by weight of the total solids of the coating, the amount of the polyolefin wax of (c) being 5 to 30% by weight of the total solids of the coating, and the lubricant film having a thickness of 0.5 to 5 micrometers and a Vickers hardness of at least 15. A method of producing a lubricative stainless steel pipe is also disclosed.

30 Claims, No Drawings

LUBRICATIVE STAINLESS STEEL SHEETS AND PIPES AND METHOD OF PRODUCING LUBRICATIVE STAINLESS STEEL PIPES

BACKGROUND OF THE INVENTION

1. Field of the Invention

The invention relates to stainless steel materials having excellent formability. Particularly, the invention relates to stainless steel sheets and pipes which are used for the production of household appliance products, building materials, motor vehicle parts and the like, and can be utilized, without removing a lubricating film thereon, after pressing or pipe expanding.

2. Description of the Related Art

Various types of materials are used for household appliance products, building materials, motor vehicle parts and the like and, among them, there are stainless steel materials such as stainless steel sheets or pipes. When stainless steel materials are used, they are frequently subjected to a forming process such as stamping or pipe expanding. In such a forming process, a stainless steel material is conventionally coated with a lubricant, typically a stamping oil and, after a forming process, the lubricant is removed in a degreasing process. On the other hand, as an increasingly growing tendency in late years, omitting stamping oil application and degreasing processes is demanded in terms of increased productivity, reduced production cost, and improved working environment.

For example, Japanese Patent No. 2719571 describes a water-base lubricant paint composition which is applied to a cold-rolled steel sheet or zinc-plated steel sheet, to enable the steel sheet to be formed without a stamping oil. The paint composition contains a urethane resin of an ether-ester type, a water-soluble or water-dispersible epoxy resin, a polyolefin wax, and silica powder.

In the field of plated steel sheets, lubricative plated steel sheets, which do not need application and removal of a stamping oil, have been already put to practical use. For example, Japanese Patent No. 2743237 describes a lubricative plated sheet which does not need application and removal of a stamping oil, the plated sheet having a chemical conversion film of chromate or phosphate provided on the surface of the plated sheet and a lubricative film obtained by baking a water-base lubricant coating containing a urethane resin of an ether-ester type, an epoxy resin, a polyolefin wax, and silica applied on the conversion film.

On the other hand, also in the field of stainless steel materials, there has been proposed a stainless steel sheet having a chromate layer formed on the surface of the stainless steel sheet and a lubricative coating layer, which is provided on the chromate layer, of an organic resin into which a wax or fluorine-containing resin as a lubricant component is incorporated (JP-A-6-264255, JP-A-8-41652, etc.). There has also been proposed a stainless steel pipe having a film containing an organic resin and an organic lubricant such as polyolefin wax or fluorine-containing resin particle provided on the surface of the pipe (JP-A-10-137864).

Also, in the field of stainless steel materials, a stainless steel sheet or pipe which can be efficiently formed without application and removal of a stamping oil after and before the forming process, has been proposed.

The inventors of this application have recognized, in the course of consideration of applying a lubricative film such as those described in the abovementioned Japanese Patent Nos. 2719571 and 2743237 to stainless steel materials, that there are problems with stainless steel materials, which have properties of being essentially hard and having a small elongation (low formability) compared to plated steel sheets and the like.

Generally speaking, it is thought that a dominant requirement in the forming process for a lubricative steel sheet or pipe is to prevent the metal substrate being exposed during the forming. For example, in the case of steel sheet, when a metal substrate is exposed during the forming, a metallic mold and a metal substrate of steel sheet come in contact with each other to cause a phenomena of "galling", which is also called "pickup" or "fouling", resulting in reduced lubricating effect and prevention of satisfactory forming. In the case where a steel pipe is expanded, as the expanding process progresses, portions of wall of the pipe on the expanding members of an expanding tool continue to be in contact with the expanding members, whereas portions of wall of the pipe between the expanding members are stretched in the circumferential direction by the portions on the expanding members, and tend to result in a smaller thickness compared to a thickness of the portions on the expanding members. Although this tendency can be reduced by enhancing lubricity of the inner surface of the steel pipe, which is in contact with the expanding members, galling can occur in such a case, depending on performance of a lubricant film on the surface of the steel pipe. For measures against these problems, the following have been contemplated: (1) lowering the coefficient of friction of the surface of the lubricative steel sheet or pipe, (2) controlling the hardness of the lubricant film, (3) improving the adhesion of the lubricant film to the metal substrate, and (4) providing the lubricate film with a thickness depending on a surface roughness of the metal substrate so that the metal substrate is not partially exposed at the surface of the lubricant film after the formation of the lubricant film. These measures are particularly important for stainless steel materials having lower formability compared to plated steel sheets and the like. Nevertheless, among these, the measures of (1), (3), and (4) have been already studied, whereas the hardness of (4) has not been studied to date. In other words, stainless steel materials having a lubricant film provided which have been proposed to date are not necessarily optimized in terms of a hardness of film.

SUMMARY OF THE INVENTION

The inventors have reached the present invention of stainless steel sheets and pipes, as really useful lubricative stainless steel materials, by optimizing the lubricant film, particularly in terms of its hardness, in the course of studying the application of lubricant films, as described in Japanese Patent Nos. 2719571 and 2743237, to stainless steel materials.

The lubricative stainless steel sheet of the invention is characterized by having a chromate film on at least one of the surfaces of a stainless steel sheet substrate, the chromate film having an amount of adhered Cr of 5 to 100 mg/m$^2$, and, on the chromate film, a lubricant film obtained by applying, to the chromate film, a water-base coating containing (a) a urethane resin of an ether-ester type having a skeleton of bisphenol type, a skeleton of ester, and a carboxyl group, (b) an epoxy resin, and (c) a polyolefin wax, and baking the applied coating, the sum of the amounts of the urethane resin of (a) and the epoxy resin of (b) being 70 to 95% by weight of the total solids of the coating, the amount of the polyolefin wax of (c) being 5 to 30% by weight of the total solids of the coating, and the lubricant film having a thickness of 0.5 to 5 micrometers and a Vickers hardness of at least 15.

The lubricative stainless steel pipe of the invention is characterized by having a chromate film on at least one of the outer and inner surfaces of a stainless steel pipe substrate, the chromate film having an amount of adhered Cr of 5 to 100 mg/$m^2$, and, on the chromate film, a lubricant film obtained by applying, to the chromate film, a water-base coating containing (a) a urethane resin of an ether-ester type having a skeleton of bisphenol type, a skeleton of ester, and a carboxyl group, (b) an epoxy resin, and (c) a polyolefin wax, and baking the applied coating, the sum of the amounts of the urethane resin of (a) and the epoxy resin of (b) being 70 to 95% by weight of the total solids of the coating, the amount of the polyolefin wax of (c) being 5 to 30% by weight of the total solids of the coating, and the lubricant film having a thickness of 0.5 to 5 micrometers and a Vickers Hardness of at least 15.

The lubricative stainless steel pipe of the invention can be produced by a method which comprises providing, on only one surface or both surfaces of a stainless steel sheet, a chromate film having an amount of adhered Cr of 5 to 100 mg/$m^2$, subsequently applying, to the chromate film, a water-base coating containing (a) a urethane resin of an ether-ester type having a skeleton of bisphenol type, a skeleton of ester, and a carboxyl group, (b) an epoxy resin, and (c) a polyolefin wax, the sum of the amounts of the urethane resin of (a) and the epoxy resin of (b) being 70 to 95% by weight of the total solids of the coating, and the amount of the polyolefin wax of (c) being 5 to 30% by weight of the total solids of the coating, then baking the applied coating to form a lubricant film having a thickness of 0.5 to 5 micrometers and a Vickers Hardness of at least 15, and using the resultant stainless steel sheet provided with the lubricant film to produce an outer- or inner-surface lubricative stainless steel pipe, in the case where the stainless steel sheet has the lubricant film only on one surface, by forming it into a piping shape and sealing the opposed edges thereof to provide a complete pipe, in such a manner that the surface of the sheet provided with the lubricant film is at the outer or inner side of the pipe, or to produce a both-surface lubricative stainless pipe, in the case where the stainless steel sheet having the lubricant film on both surfaces, by simply piping and welding to provide a complete pipe.

DETAILED DESCRIPTION OF THE INVENTION

A stainless steel sheet or pipe used as a substrate material (base material) of the lubricative stainless steel sheet or pipe of the invention may be any stainless steel sheet or pipe conventionally used to provide a finished article after some forming process such as stamping or pipe expanding, or to be incorporated as a component to a finished article.

The lubricative stainless sheet or pipe of the invention has a chromate film as a chemical conversion film on at least one of the surfaces of a stainless steel sheet or at least one of the outer and inner surfaces of a stainless steel pipe. The chromate film is located between a substrate of stainless steel material and a lubricant film, and provides adhesion therebetween during forming process. As the chromate film, an electrolytic-reduction chromate film of post-water-washed type based on a hydrated oxide of trivalent chromium, or a coated chromate film of non-water-washed type obtained by the application and drying of an etching chromate solution of post-water washed type based on hydrated oxides of trivalent and hexavalent chromium can be used. An amount of adhered chromate, calculated as Cr, is 5 to 100 mg/$m^2$. An amount below 5 mg/$m^2$ is not preferred because improvement of adhesion cannot be expected. In an amount above 100 mg/$m^2$, the chromate itself tends to suffer from cohesive failure, and sufficient adhesion is also not achieved. It is desirable that the chromate film has a high trivalent Cr/hexavalent Cr ratio, and is difficult dissolve in a water-base lubricant coating.

In the lubricant film used in the invention, it is essential to formulate appropriate resins in a certain weight ratio, to thereby provide a good balance between adhesion, elongation, shear strength, abrasion resistance, and chemical resistance.

To achieve a high formability in a lubricative stainless steel material, a coated film must be uniform and have good adhesion and balance between strength and elongation. By the use of a urethane resin having a high molecular weight and an epoxy resin in combination, control of basic physical properties of a resultant film is easier than that of a film made by crosslinking two resins each having a low molecular weight, and it is easy for even a thin film of 0.5 to 5 micrometer thick to have stable physical properties. As used herein, the urethane resin having a low molecular weight is a type of urethane resin containing any isocyanate-based crosslinker. In the invention, the combination of a urethane resin having a molecular weight of not less than 3000 and having good wear resistance and an epoxy resin excellent in improvement of adhesion or film strength provides a base resin suitable for the display of properties such as particularly high formability.

The urethane resin (a) in the invention is a water-dispersible urethane resin of an ether-ester type having a molecular weigh of not less than 3000 and having bisphenol and ester skeletons and a carboxyl group. The epoxy resin (b) in the invention is an epoxy resin of a type having a glycol or bisphenol skeleton, and is used in an amount which causes 20 to 100% of the carboxyl groups of the urethane resin (a) to be reacted. The use of the urethane resin having a high molecular weight ensures the formation of a uniform film even at a small thickness.

Control of physical properties of a urethane resin is, in general, carried out by adjusting the hard and soft segments and the crosslinking density and, accordingly, the physical properties can be controlled over a wide range depending on the skeletons in a molecule and the type of isocyanate used for the preparation of the resin. The elongation and tensile strength of the urethane resin used in the invention is controlled by the contents of an ester skeleton providing flexibility, an ether skeleton providing toughness, and a urethane bond. When the content of the urethane bond is increased, a strong resin having a small elongation but a large tensile strength can be obtained. For particularly excellent lubricative properties, a urethane resin having polyester and polyether (of a bisphenol type) skeletons is preferable to a urethane resin having only polyester skeleton and having physical properties similar to those of the resin in the invention. It is readily conceived, from the fact that lubricating properties of a resin largely depend on not only its elongation and strength but also on its adhesion to a substrate, that a resin containing a bisphenol skeleton is superior in lubricating properties to a resin not containing a bisphenol skeleton. It is preferred that the weight ratio of polyether and polyester skeletons is in the range of 10:90 to 70:30. When a polyether is contained in excess of the above ratio, a film obtained using the resin is strong but has a small elongation, to cause less flexibility.

As a method of imparting improved flexibility and chemical resistance to a urethane resin system having a molecular weight of not smaller than 3000 obtained by polymerizing a polyol of an ether and ester type by an isocyanate, which forms, by itself, a film by heating, there is a method in which an epoxy resin having a reactive functional group (for example, a hydroxyl or an epoxy group) is incorporated in the system, and crosslinking the system by heating provides the resultant film with improved functionality. The epoxy-modified urethane resin in this method yields, by itself, a film having improved flexibility and chemical resistance. Although the crosslinking reaction progresses with the combined resin system alone, an isocyanate or amino compound or the like, called a curing agent, may be incorporated in the system.

As the polyether polyol of another skeleton in the urethane resin used in the invention, reference can be made to polyols in which ethylene oxide, propylene oxide or the like is added to a glycol having a smaller molecular weight such as ethylene glycol, propylene glycol, and bisphenol A, and polyoxytetramethylene glycol. Particularly, polyether polyols having a skeleton of bisphenol A are preferred. As the polyester polyol of the skeleton in the urethane resin, reference can be made to polyols obtained by ring-opening polymerizing a polyester obtained by a dehydration condensation reaction of a glycol having a small molecular weight with a dibasic acid, or a lactam, such as ϵ-caprolactam, in the presence of a glycol having a small molecular weight.

As the isocyanate bonding the ester and ether skeletons in the urethane resin, reference can be made to monomers, dimers and trimers of aromatic diisocyanates, such as tolylene diisocyanate, diphenylmethane diisocyanate and xylylene diisocyanate, reaction products of them with a polyether polyol or polyester polyol, and alicyclic isocyanates which are hydrogen-added derivatives thereof; monomers, dimers and trimers of alicyclic and aliphatic isocyanates, such as isophorone diisocyanate and hexamethylene diisocyanate, reaction products of them with a polyether polyol or polyester polyol; and mixtures thereof. An isocyanate in the amount of 5 to 20% by weight, as calculated as NCO, of the urethane results in a film with optimum flexibility, depending on ratio of polyester polyol, polyether polyol, and a component for introducing a carboxyl group, which will be described below, and molecular weights thereof.

The carboxyl group contained in the urethane resin is a functional group for self-emulsification, and greatly contributes to adhesion of a film to the surface of metal. As the component introducing the carboxyl group, reference can be made to compounds having two or more hydroxyl or amino groups and one or more carboxyl groups, for example, dihydroxy dicarboxylic acid such as 2,2-dimethylol acetic acid, 2,2-dimethylol propionic acid, 2,2-dimethylol butyric acid, and 2,2-dimethylol pentanoic acid, and diamino carboxylic acid such as lysine and arginine. A carboxyl-containing compound selected from these polymerizes an isocyanate compound in combination with the polyester polyol and polyether polyol described above, to thereby provide a urethane resin of ether-ester type having a molecular weight of not smaller than 3000 and having a carboxyl group used in the invention.

A water-base coating is prepared by dispersing the urethane resin described above in water using, for example, a method in which the carboxyl group is neutralized by an alkaline compound such as ammonia or trimethylamine for the self-emulsification, or a method in which an emulsifier is used for dispersion. For environmental protection, it is most preferable to recover an organic solvent or solvents used in processes prior to the preparation of water-base coating, and eventually make a water dispersion of a non-solvent type. It is preferred that the amount of carboxyl group represents an acid value per solid urethane of 10 to 50. For an acid value of smaller than 10, a lubricant film formed has poor adhesion and provides less formability. For an acid value of larger than 50, a lubricant film has reduced water resistance and alkaline resistance.

The lubricant coating used in the invention contains an epoxy resin (b). As the epoxy resin, a water-soluble or water-dispersible epoxy is used to provide a water-base lubricant coating. In addition, the epoxy resin has a reactive functional group, such as hydroxyl or epoxy group, for the reaction with the urethane resin (a).

It is preferred that the epoxy resin having such a reactive functional group is used in an amount which is effective to cause 20 to 100% of the carboxyl group of the urethane resin to be reacted. In the amount causing 20% or less of the carboxyl group to be reacted, effects of the use of epoxy resin is not evident. The epoxy resin also largely contributes to the improvement of chemical resistance. The epoxy resin having a skeleton of bisphenol A type has a remarkable effect on the improvement of adhesion. When a coating of non-solvent type is demanded for environmental protection or a coating of non-emulsifier type is demanded to prevent degradation of performance of the coated film, a water-soluble epoxy resin can be obtained using a glycol skeleton to make it hydrophilic.

The amount of the epoxy resin to be used must be determined depending on an acid value of the urethane resin, and is calculated as follows. Assuming that equivalent amounts of carboxyl group of the urethane resin and epoxy group of the epoxy resin react with each other, an amount of epoxy resin required for 100% of the carboxyl group of a urethane resin having a given acid value (AV) to react is determined by the following equation:

$$\text{Weight of solid epoxy (g)} = \text{AV value of urethane resin} \times [(1/56)/1000] \times \text{epoxy equivalent} \times \text{weight of urethane resin (g)}.$$

In the invention, the epoxy group of the epoxy resin is crosslinked with the carboxyl group of the urethane resin. As a consequence, part of carboxylic acid, which contributes to adhesion, is consumed, but adhesion is secured because an OH group is generated by the ring opening of the epoxy group. In the combination of a urethane resin having a molecular weight of smaller than 3000 and the above-described epoxy resin, stable high formability is not achieved. Also, the use of a urethane resin having a molecular weight of not less than 3000 alone leads to poor formability.

It is appropriate that the total weight of the urethane resin (a) and the epoxy resin (b) as solids in the water-base lubricative coating composition used in the invention corresponds to 70 to 95% of the total solids of the composition. In the case of the total weight of the urethane resin (a) and the epoxy resin (b) of smaller than 70% and larger than 95%, the composition provides poor formability.

Using the film obtained from only these resins, the intended formability cannot be achieved and, accordingly, it is necessary to use a lubricant additive in combination with the resins. As the lubricant additive, reference can be made to commonly known lubricants based on fluorinated materials, hydrocarbons, aliphatic amides, ester compounds, alcohols, metallic soaps, inorganic materials and the like. It is preferred that the lubricant additive to improve formability is selected so that a lubricant added in a coating composition exists at the surface of a resin film formed from the coating composition rather than being dispersed in the film, in terms of the reduction of friction between the surfaces of a workpiece and a mold for maximal lubricant effects. If the lubricant is dispersed in the formed film, the film has a large coefficient of surface friction, and tends to be easily broken, resulting in the deposition of stripped powder materials (a phenomenon called powdering) which in turn leads to defective appearance of the workpiece and reduced formability. As the material which will exist at the surface of a resin film, a material which is incompatible with the resins used and has a small surface energy is selected.

A polyolefin wax is preferred as a lubricant additive, because it highly improves formability, and provides a workpiece with good performances after forming, such as chemical resistance. As the polyolefin wax, reference can be made to waxes based on hydrocarbon, such as paraffin, microcrystalline, and polyethylene waxes. Since at the forming of material, the film temperature is increased by heat of deformation and heat of friction, it is appropriate that the wax has a melting point of 70 to 160° C. In the case of the wax having a melting point of below 70° C., the wax is softened and melted during the working, and does not display excellent properties as a solid lubricant additive. In the case of the wax having a melting point in excess of 160° C., hard particles of wax exist at the surface of the resin film and lessen frictional properties, preventing good formability.

Preferably, a wax having a saponification value of zero or not larger than 30 and a branched structure is used. A wax having a saponification value in exces of 30 has a large polarity and tends to be compatible with a resin, so that it hardly exists locally at the surface of coated resin composition during the formation of film and, accordingly, it cannot be said that such a wax is appropriate, particularly when a high level of working performance is required. A particularly preferred wax is one having a saponification value of zero which has a small compatibility with a resin and does not have an ester bond.

Preferably, the wax has a particle diameter of 0.1 to 7.0 micrometers. A wax having a particle diameter of larger than 7.0 micrometers is not preferred because of non-uniform distribution of solidified wax after the fusion. Also, when using a wax having a particle diameter of smaller than 0.1 micrometer, the formability becomes insufficient.

The lubricant additive is used in an amount of 5 to 30% of the total weight of solids of lubricant coating. If the amount is smaller than 5%, the improvement of formability is small, and if the amount is larger than 30%, formability is also reduced.

In the invention, as a further additive, silica ($SiO_2$) may be added in a coating composition also for an improvement in formability, in an amount of 5 to 25% of the total solids of the coating composition. If the amount is smaller than 5%, the improvement of formability is small, and if the amount is larger than 25%, formability is less because the binder effects of the resin become small and the resin has a reduced elongation. It is preferred that the silica has a particle diameter of 3 to 30 micrometers. In the cases of particle diameters of smaller than 3 micrometers and larger than 30 micrometers, formability is poor. As the silica, liquid-phase colloidal silica and vapor-phase silica may be used, although the silica used in the invention is not particularly limited thereto. Also, an electrically-conductive material for the improvement of weldability of a product stainless steel sheet or pipe, or a coloring pigment material for the improvement of design of a product stainless steel sheet or pipe, may be added. Furthermore, additives such as an anti-sedimentation agent, a leveling agent, and a thickening agent may be added, as required.

Since the lubricant coating used in the invention is a water-base coating, which has a higher surface tension than that of a solvent-base coating and is accordingly inferior in surface wettability to it, there may be a case where uniform coating is not obtained when a given amount of coating is applied to a surface to be coated. It is indispensable that a uniform coating is provided on a surface to be coated in order to secure good formability and other performances. A chromate film provided on the surface of a stainless steel sheet or pipe, as an underlying layer for a lubricant coating, has an effect on the improvement of wettability of the surface to be coated. Apart from this, it is known that, for the purpose of improvement of wettability, a wetting agent or thickening agent is added in a lubricant coating. As the wetting agent, reference can be made to commonly known surfactants which reduce surface tension, such as those based on a fluorinated material, a silicone, a glycol, and an alcohol. In the invention, incorporating 0.05 to 0.5% of a surfactant of an acetylene glycol-alcohol type having the number of moles of added ethylene oxide of 0 to 20 in a water-base lubricant coating composition results in particularly preferable improvement in wettability.

A thickening agent may be added for measures against the case where complete films of the surface coating cannot be provided at cissing spots by the use of a weting agent alone, or the case where a sufficient thickness of coating film cannot be obtained by an application process such as a roll coater process. The lubricant coating used in the invention is usually applied, at a high speed, to a material to be coated and, accordingly, a thickening agent of thixotropy type represented by a cellulosic thickening agent is less effective in the application conditions where a high speed shearing stress is involved. It is know that a thickening agent of a Newtonian type is appropriate in such application conditions. As the thickening agent used in the invention, a thickening agent having an ether-urethane skeleton and a molecular weight of 1,000 to 20,000 is particularly preferred. This thickening agent has compatibility with the skeleton of a urethane resin which is a base resin in the coating used in the invention, and accordingly shows Newtonian thickening behavior of an association type and has an useful effect in a small amount. This thickening agent is characterized by having a very small effect when it is left in a coated film because of its skeleton which is hard to hydrolyze, although, in general, a thickening agent added to a coating composition often lowers the original performance of the coating composition. The thickening agent is added to the water-base lubricant coating composition in the invention in an amount of 0.01 to 0.2% of resinous solids of the composition, which is practically determined depending on the application conditions. In an amount smaller than 0.01%, the agent has little effect of thickening, and in an amount larger than 0.2%, the thickening agent causes the viscosity of a coating composition to be increased, resulting in a hindrance to application of the coating composition and lowered formability.

The water-base lubricant coating composition used to manufacture the lubricative stainless steel sheet or pipe of the invention is prepared as an aqueous dispersion comprising a urethane resin (a), an epoxy resin (b), and a polyolefin wax, as the indispensable components as described above, and, as required, other optional component or components. The composition may be prepared by, for example, mixing a dispersion or solution containing some of the components with another dispersion or solution containing the remainder components, or making a dispersion or solution containing some of the components and adding thereto the remainder components.

As a process for applying a prepared coating composition to a stainless steel sheet or pipe substrate, bar coating, brushing, roll coating, curtain coating, a coating process in which a curtain-coated composition is wiped using air or a wiper of rubber or the like, electrostatic coating, or spray coating or the like can be used, although a useful coating process is not limited thereto. An aqueous dispersion of lubricant coating composition used for the application of the composition should be adjusted to have properties such as viscosity to be adapted to the application process used.

A lubricative coated film is formed from a prepared lubricant coating composition by applying an aqueous dispersion of the coating composition to a stainless steel material substrate on which a chromate film has been previously formed, removing water from the applied composition to leave solids including resin particles of the composition on the chromate film, baking the composition to soften and melt resin particles, and promoting crosslinking reactions between a urethane resin and an epoxy resin of the coating composition to bond the particles together to thereby form a lubricative film.

An optimum thickness of the formed lubricant film is difficult to specify since it depends on the forming process to be used as well as the surface roughness of the stainless steel substrate used. In general, however, it is recognized that a thicker film is favorable to deep drawing, and a thinner film is favorable to L-bending. On the other hand, too thin a film does not provide an expected lubricating performance and too thick a film gives rise to problems such as generation of press tailings. Taking these into consideration, a practical range of thickness of the lubricant film is specified to be 0.5 to 5 micrometers in the invention. More preferably, the lubricative film has a thickness of 1 to 3 micrometers.

The lubricant film of the lubricative stainless steel sheet or pipe of the invention is needed to have a Vickers hardness of at least 15. A lubricant film having a Vickers hardness of smaller than 15 tends to generate galling during working process. The urethane resin of a component of the lubricant film in the invention has polar groups in its molecule, and enables the film to have an increased hardness through the generation of internal stress by hydrogen bonding of the polar groups. Furthermore, in the lubricant film of the invention, physical bonding is also formed by the crosslinking between a urethane molecule and an epoxy molecule, which also contributes to the increase in hardness of the lubricant film. In contrast, a lubricant film obtained by the use of a general olefin-based acrylic resin has a Vickers hardness of about 10. The lubricant film of the lubricative stainless steel sheet or pipe of the invention has a Vickers hardness of at least 15, preferably at least 20.

In the invention, the hardness of the lubricant film may be controlled to be in a preferred range by adjusting the numbers of isocyanate groups of a urethane resin and reactive functional groups of an epoxy resin depending on the urethane and epoxy resins used. The hardness of the film can be also increased by adding a hard pigment, such as silica, in the film. Alternatively, the hardness of the film can be also increased by increasing the percentage of polyether skeletons in the urethane resin (a).

The Vickers hardness specified in the invention is to be measured on a lubricant film having a thickness of 3 micrometers. Conventionally, a Vickers hardness is determined by pushing a Vickers penetrator (a diamond pyramid penetrator having an angle between the opposite faces of 136 degrees) against a test face of a sample by applying a static load, measuring the length of diagonal line of the resultant indentation formed on the test face to determine an area of the indentation, and dividing the value of the area by the applied load. In the case of a sample having a small thickness as the lubricant film in the invention, a load used for the measurement is small, leading to a small indentation, which makes it difficult to measure the length of diagonal line of the indentation and know an exact hardness. In the invention, a technique enabling a hardness to be exactly determined in such a case is utilized to measure a Vickers hardness of a lubricant film. Specifically, the measurement of Vickers hardness of a lubricant film by this technique can be effected using the Dynamic Ultramicro-Hardness Meter DUH-200 available from Shimazu Seisakusho. In this device, a load is applied by a electromagnetic force rather than a weight, and a value of hardness which is automatically calculated from data measured optically can be obtained.

The lubricative stainless steel sheet can be produced by applying a water-base lubricant coating, by a suitable process as referred to above by way of example, to a stainless steel sheet on which a chromate film has been previously formed, to form a coated film, and drying and baking the coated film to form a lubricant film. Both a method of forming a chromate film and a method for the formation of a lubricant film are commonly known, and are not explained in detail herein.

The lubricative stainless steel pipe of the invention can be produced as follows. First, a lubricative film is provided on one or both surfaces of stainless steel strip on which a chromate film having an amount of adhered Cr of 5 to 100 $mg/m^2$ is formed, the lubricative film obtained by applying, on the chromate film, a water-base coating containing (a) a urethane resin of ether-ester type having a skeleton of bisphenol type, a skeleton of ester, and a carboxyl group, (b) an epoxy resin, and (c) a polyolefin wax, and baking the applied coating, the sum of the amounts of the urethane resin of (a) and the epoxy resin of (b) being 70 to 95% by weight of the total solids of the coating, the amount of the polyolefin wax of (c) being 5 to 30% by weight of the total solids of the coating, and the lubricant film having a thickness of 0.5 to 5 micrometers and a Vickers Hardness of at least 15. In the case where an outer-surface lubricative stainless steel pipe is to be produced, the stainless steel strip having the lubricant film on one surface is then shaped into a preformed pipe-like strip in such a manner that the film is on the outer side of the preformed strip, and the strip is seamed to form a pipe by high frequency welding, TIG welding, laser welding or the like. In the case of where an inner-surface lubricative stainless steel pipe is to be manufactured, the stainless steel strip having the lubricant film on one surface is shaped into a preformed pipe-like strip in such a manner that the film is on the inner side of the preformed strip, and the strip is seamed to form a pipe also be high frequency welding, TIG welding, laser welding or the like. Similarly, in the case of where both-surface lubricative stainless steel pipe is to be manufactured, the stainless steel strip having the lubricant film on both surfaces is shaped into a preformed pipe-like strip, and the strip is seamed to form a pipe also by high frequency welding, TIG welding, laser welding or the like. The method of manufacturing a lubricative stainless steel pipe of the invention is very useful, particularly in the manufacture of an inner-surface lubricative stainless steel pipe, because it is difficult to form a uniform film of necessary thickness on the inner surface of material already having a shape of pipe.

EXAMPLES

The following examples will further describe the invention. Of course, the invention is not limited to the examples.

Example 1

Six types of one-surface lubricative stainless steel strips (samples No. 1 to No. 6) each having a thickness indicated in Tables 1 and 2 were produced as follows. A ferrite stainless steel strip (11% Cr) having a thickness of 2.9 millimeters was pickled, and was then provided on its one face with a chromate film in an amount of Cr adhered of 20 mg/m$^2$. A lubricate film was then formed on the chromate film by applying on it a water-base coating containing (a) a urethane resin having an average molecular weight of 60,000, a solid weight ratio of ether to ester of 0.92:1, a content of isocyanate of 11% by weight (calculated as % by weight NCO), and an ether type of bisphenol A, (b) an epoxy resin of bisphenol A type having an epoxy equivalent of 450, and (c) a low density polyolefin wax having an average diameter of 1.0 micrometer, a specific gravity of 0.92, and a melting point of 115° C., the sum of the amounts of the urethane resin of (a) and the epoxy resin of (b) being 87% by weight of the total solids of the coating, and the amount of the polyolefin was of (c) being 13% by weight of the total solids of the coating, and baking the applied coating.

Subsequently, the one-surface lubricative stainless steel strips thus produced were formed into pipes (76.3 mm outer diameter D, 2.9 mm thickness, and 5.4 m length) having the lubricative inner surface by shaping and subsequent laser welding.

Each of the inner-surface lubricative stainless steel pipes was cut into eighty short pipes having a length of 500 millimeters, which were divided into four groups of twenty short pipes. The four groups of pipes were then worked using four types of inner jigs and working processes indicated below, respectively. The worked pipes were observed for rupture of the pipe, flaking of the lubricant film, galling or fouling of the inner jig, and deposition of flaked film on the inner jig. The results are shown in Tables 1 and 2.

(1) Bending: Rotary draw bending at R=152.6 mm (2D). To prevent offset of the pipe, an inner jig (mandrel) having a diameter of 70 mm was used.

(2) Diameter expanding: Diameter of pipe was expanded to outer diameter $D_1$ of 99 mm (1.3D) using nail-like inner jigs.

(3) Diameter squeezing: Diameter was squeezed to outer diameter $D_2$ of 46 mm (0.6D) using squeezing die. To prevent buckling of the inner face, an inner jig (mandrel) was used.

(4) Hydrostatic bulge forming: Diameter was expanded to outer diameter $D_3$ of 114 mm (1.5D) using hydraulic pressure. To seal both ends of pipe, an inner jig (punch).

In the case of pipes provided on the inner face with a lubricant film having a thickness smaller than 0.5 micrometer, as in sample No. 1 of the comparative example, ruptures occurred in the circumferential direction of some pipes in the bending of (1), some worked pipes had ruptures in the longitudinal direction occurring from near the nails in the diameter expanding of (2), some worked pipes had ruptures in the circumferential direction in the diameter squeezing of (3), and some worked pipes had ruptures in the longitudinal direction occurring in the hydrostatic bulge forming of (4). In this case, galling and fouling were also observed in the inner jig.

In the case of pipes provided on the inner face with a lubricant film having a thickness of larger than 5 micrometers, as in sample No. 6 of comparative example, flaking of the lubricant film on the inner surface of the worked pipes occurred in all of (1) bending, (2) diameter expanding, (3) diameter squeezing, and (4) hydraulic bulging. In this case, deposition of flakes on the inner jigs was also observed. The deposition of flakes causes the occurrence of defects in a workpiece during the working.

In the case of pipes of samples Nos. 2 to 5, provided on the inner face with a lubricant film having a thickness within the range of 0.5 to 5 micrometers, all of a total of 20 pipes were satisfactory worked in each of (1) bending, (2) diameter expanding, (3) diameter squeezing, and (4) hydrostatic bulge forming. The occurrence of galling and fouling and the deposition of flakes were not observed at all on the inner jigs. As is evident from these results, the lubricative stainless steel pipes of the invention provided on the inner surface with a lubricant film having a thickness of 0.5 to 5 micrometers and a Vickers hardness of not smaller than 15 are very useful and appropriate in terms of the reduction of friction between the inner jig and the worked pipe.

Additionally, similar lubricative stainless steel pipes (sample Nos. 7 to 10) were produced using a general olefin-based acrylic resin, and were tested as in the preceding samples. The results are shown in Tables 3 and 4. In this case, since the film of the lubricative stainless steel pipes satisfied the condition of thickness of 0.5 to 5 micrometers but did not have a Vickers hardness of 15 or higher, galling was observed, and it is understood that the pipes did not provide necessary lubricative properties.

From the above, it is understood that only the lubricative sainless steel pipe of the invention can establish a good lubricative relationship with a working jig.

TABLE 1

| Sample No. | Film Thick. (μm) Inner Surface | Outer Surface | Vickers Hardness | (1) Bending (20 Pieces) No. of Raptured Pieces | No. of Pieces of Flaking | Galling | Deposition of Flaked Film | (2) Dia. Expanding (20 Pieces) No. of Raptured Pieces | No. of Pieces of Flaking | Galling | Deposition of Flaked Film | Note |
|---|---|---|---|---|---|---|---|---|---|---|---|---|
| 1 | 0.3* | None | 22 | 9 | 0 | Yes | None | 15 | 0 | Yes | None | Comparative |
| 2 | 0.5 | None | 25 | 0 | 0 | None | None | 0 | 0 | None | None | Invention |
| 3 | 1 | None | 30 | 0 | 0 | None | None | 0 | 0 | None | None | |
| 4 | 2 | None | 16 | 0 | 0 | None | None | 0 | 0 | None | None | |
| 5 | 5 | None | 32 | 0 | 0 | None | None | 0 | 0 | None | None | |
| 6 | 7* | None | 29 | 0 | 7 | None | Yes | 0 | 18 | None | Yes | Comparative |

*Outside of the range specified in the invention.

TABLE 2

| Sample No. | Film Thick. (μm) Inner Surface | Outer Surface | Vickers Hardness | (3) Dia. Squeezing (20 Pieces) No. of Raptured Pieces | No. of Pieces of Flaking | Galling | Deposition of Flaked Film | (4) Hydraulic Bulging (20 Pieces) No. of Raptured Pieces | No. of Pieces of Flaking | Galling | Deposition of Flaked Film | Note |
|---|---|---|---|---|---|---|---|---|---|---|---|---|
| 1 | 0.3* | None | 22 | 3 | 0 | Yes | None | 2 | 0 | Yes | None | Comparative |
| 2 | 0.5 | None | 25 | 0 | 0 | None | None | 0 | 0 | None | None | Invention |
| 3 | 1 | None | 30 | 0 | 0 | None | None | 0 | 0 | None | None | |
| 4 | 2 | None | 16 | 0 | 0 | None | None | 0 | 0 | None | None | |
| 5 | 5 | None | 32 | 0 | 0 | None | None | 0 | 0 | None | None | |
| 6 | 7* | None | 29 | 0 | 5 | None | Yes | 0 | 3 | None | Yes | Comparative |

*Outside of the range specified in the invention.

TABLE 3

| Sample No. | Film Thick. (μm) Inner Surface | Outer Surface | Vickers Hardness | (1) Bending (20 Pieces) No. of Raptured Pieces | No. of Pieces of Flaking | Galling | Deposition of Flaked Film | (2) Dia. Expanding (20 Pieces) No. of Raptured Pieces | No. of Pieces of Flaking | Galling | Deposition of Flaked Film | Note |
|---|---|---|---|---|---|---|---|---|---|---|---|---|
| 7 | 0.5 | None | 14* | 4 | 0 | Yes | None | 8 | 0 | Yes | None | Comparative |
| 8 | 1 | None | 10* | 8 | 0 | Yes | None | 12 | 0 | Yes | None | |
| 9 | 2 | None | 14* | 3 | 0 | Yes | None | 5 | 0 | Yes | None | |
| 10 | 5 | None | 8* | 2 | 0 | Yes | None | 4 | 0 | Yes | None | |

*Outside of the range specified in the invention.

TABLE 4

| Sample No. | Film Thick. (μm) Inner Surface | Outer Surface | Vickers Hardness | (3) Dia. Squeezing (20 Pieces) No. of Raptured Pieces | No. of Pieces of Flaking | Galling | Deposition of Flaked Film | (4) Hydraulic Bulging (20 Pieces) No. of Raptured Pieces | No. of Pieces of Flaking | Galling | Deposition of Flaked Film | Note |
|---|---|---|---|---|---|---|---|---|---|---|---|---|
| 7 | 0.5 | None | 14* | 3 | 0 | Yes | None | 5 | 0 | Yes | None | Comparative |
| 8 | 1 | None | 10* | 6 | 0 | Yes | None | 9 | 0 | Yes | None | |
| 9 | 2 | None | 14* | 2 | 0 | Yes | None | 7 | 0 | Yes | None | |
| 10 | 5 | None | 8* | 5 | 0 | Yes | None | 3 | 0 | Yes | None | |

*Outside of the range specified in the invention.

Example 2

This example illustrates lubricative stainless steel sheets of the invention.

1. Preparation of test pieces (1-1) Testing material

Commercially available ferrite stainless steel sheets (11% Cr) having a thickness of 0.8 millimeter was used as testing materials.

(1-2) Degreasing

The testing material was degreased using a silicate-based alkaline degreasing agent, Finecleaner 4336, manufactured by Nihon Parkerizing (concentration=20 g/l, temperature=60° C., sprayed for 2 minutes).

(1-3) Chromate treatment of substrate

The testing material was sprayed with a mixture of 40%-reduced chromic acid and phosphoric acid in a ratio of 1:1, and was dried at an atmosphere temperature of 220° C. (reached metal temperature=100° C.) for 10 seconds. The amount of Cr adhered was 100 mg/$m^2$.

(1-4) Application of lubricant coating composition

Lubricant coating compositions were prepared using components indicated in Tables 5 to 9 and compositions indicated in Tables 10 and 11. A chromate-treated stainless steel sheet substrate was coated with a coating composition using a bar coater, and was dried at an atmosphere temperature of 260° C. (obtained metal temperature=160° C.) for 30 seconds, to thereby form a lubricant film having a thickness of 3 micrometers on the substrate.

(1-5) Hardnesses of films (Vickers hardnesses)

Hardnesses of films thus formed were measured by the Dynamic Ultramicro-Hardness Meter DUH-200 available from Shimazu Seisakusho using a diamond pyramid penetrator having an angle between the opposite faces of 115 at an applied load of 0.5 gram.

2. Tests of performances of coated sheets (2-1) Formability

A high-velocity cupping test was carried out in the conditions of a punch diameter of 50 millimeters, a blank holder pressure of 3.0 metric tons, and a deep drawing rate of 30 meters per minute. A limiting drawing ratio in this test was 2.0. When a blank was fractured, the blank diameter was increased by 5 millimeters.

Evaluation criterion

A=Blank failure. Also fracture at drawing ratio of 2.1.

B=Blank failure, no damage to film in cylindrical section.

C=Blank failure, damage to film in cylindrical section.

D=No blank failure.

(2-2) Galling

A test piece was cut into a strip having a width of 30 millimeters and, using the strip, a draw bead test was carried out at a tip radius of 0.5 millimeter, a forming height of 4 millimeters, a press load of 0.5 metric ton, and a drawing speed of 240 millimeters per minute, to evaluate the appearance of galling.

Evaluation criterion

A=No damage to film.

B=Damage to film observed in less than 5% of entirety of worked portion of tested strip.

C=Damage to film observed in not less than 5% and less than 20% of entirety of worked portion of tested strip.

D=Damage to film observed in not less than 20% of entirety of worked portion of tested strip.

(2-3) Chemical resistance

A solvent resistance or alkaline resistance test was carried out to evaluate chemical resistance of test pieces. A test piece was exposed trichlene vapor for 3 minutes in the solvent resistance test, or was immersed in an solution of silicate-based alkaline degreasing agent (20 g/l) at 60° C. for 5 minutes in the alkaline resistanse test.

Evaluation criterion

A=Damage to film observed in less than 3% of total area.

B=Damage to film observed in not less than 3% and less than 10% of total area.

C=Damage to film observed in not less than 10% of total area, and no degradation of lubricant performance observed.

D=Damage to film observed in not less than 10% of total area, and degradation of lubricant performance observed.

3. Results of tests

Results of the tests are summarized in Table 12. Samples No. 11 to No. 25 represent examples of the invention in which a chromate film was formed on a stainless steel sheet, and a lubricant coating composition was then applied to the chromate film and dried to form a lubricant film. With these samples, all of formability, galling, and chemical resistance were satisfactory. Samples Nos. 26 to 40 represent comparative examples in which any of coating composition, and amount of adhered Cr and Vickers hardness of lubricant film was deviated from the invention, and had unsatisfactory performance.

TABLE 5

| | Urethane Resin Components (a) | | | | |
|---|---|---|---|---|---|
| | A | B | C | D | E |
| Av. MW | 5000 | 60000 | 30000 | 40000 | 1500 |
| Ether:Ester (Solids Wt. ratio) | 0.32:1 | 0.92:1 | 0.03:1 | 6.14:1 | 0.47:1 |
| Ether type | Bis-phenol A | Bis-phenol A | Bis-phenol A | Bis-phenol A | Bis-phenol A |
| Acid value | 18 | 32 | 26 | 17 | 22 |
| Isocyanate (% by weight calculated as NCO) | 8 | 11 | 9 | 9 | 15 |
| Solids content in dispersion (%) | 32 | 30 | 30 | 31 | 35 |
| | F | G | H | I | J |
| Av. MW | 80000 | 70000 | 50000 | 4500 | 65000 |
| Ether:Ester (Solids Wt. ratio) | 0.22:1 | 0.30:1 | 0.27:1 | 0.54:1 | 0:1 |
| Ether type | Bis-phenol A | Bis-phenol A | Ethyl-ene glycol | Propyl-ene glycol | — |
| Acid value | 4 | 67 | 32 | 28 | 25 |
| Isocyanate (% by weight calculated as NCO) | 8 | 16 | 11 | 11 | 10 |
| Solids content in dispersion (%) | 30 | 30 | 32 | 30 | 35 |

TABLE 5-continued

TABLE 6

| | Epoxy Resin Components (b) | | |
|---|---|---|---|
| Skeleton | K Bisphenol A | L Propylene glycol | M Urethane-modified |
| Epoxy equiv. | 450 | 220 | 800 |
| Method of dispersion in water | Forced emulsification | Water-soluble | Forced emulsification |
| Solids content in dispersion (%) | 40 | 100 | 50 |

TABLE 7

| | Other Component |
|---|---|
| Type | N Ethylene-acrylic |
| Acid value | 40 |
| Solids content in dispersion (%) | 30 |

TABLE 8

| | Lubricant Additive (c) | | | |
|---|---|---|---|---|
| Skeleton | a Low-density poly-ethylene | b High-density poly-ethylene | c Poly-propylene | d Microcrystalline wax |
| Saponification value | 0 | 3 | 0 | 10 |
| Av. particle dia. (μm) | 1.0 | 3.0 | 2.0 | 4.0 |
| Specific gravity | 0.92 | 0.97 | 0.90 | 0.88 |
| Melting point (° C.) | 115 | 120 | 150 | 89 |
| Solids content in dispersion (%) | 35 | 35 | 40 | 40 |
| Skeleton | e Low-density poly-ethylene | f High-density poly-ethylene | g Partially oxidized paraffin wax | h PTFE |
| Saponification value | 50 | 0 | 15 | 0 |

TABLE 8-continued

| | Lubricant Additive (c) | | | |
|---|---|---|---|---|
| Av. particle dia. (μm) | 0.6 | 10 | 2.0 | 0.3 |
| Specific gravity | 0.92 | 0.97 | 0.86 | 2.1 |
| Melting point (° C.) | 112 | 118 | 50 | 327 |
| Solids content in dispersion (%) | 40 | 35 | 40 | 55 |

TABLE 9

| | Silica Component | | | |
|---|---|---|---|---|
| Type | i Liq.-phase colloid | j Liq.-phase colloid | k Vapor-phase | l Liq.-phase colloid |
| Av. particle dia. (nm) | 20 | 5 | 12 | 40 |
| Solids content in dispersion (%) | 20 | 20 | 10 | 20 |

TABLE 10

Compositions of Examples of the Invention

| | Solids in water-base lubricant coating composition *1 | | | | | | | |
|---|---|---|---|---|---|---|---|---|
| | Resins | | | | | | | |
| Coating No. | Urethane (a) | Epoxy (b) | Other additive | Subtotal of solids ratio $\frac{a+b}{e}$ | Lubri. additive (c) | Silica (d) | *2 Ratio of reaction (x) (%) | Film hardness |
| 1 | A (0.82) | K (0.10) | — | (0.92) | a (0.08) | (0) | 80.7 | 21 |
| 2 | A (0.85) | L (0.05) | — | (0.90) | b (0.10) | (0) | 85.7 | 18 |
| 3 | B (0.67) | L (0.13) | — | (0.80) | a (0.20) | (0) | 153 | 28 |
| 4 | B (0.70) | M (0.15) | — | (0.85) | c (0.15) | (0) | 48.6 | 24 |
| 5 | B (0.78) | K (0.12) | — | (0.90) | d (0.10) | (0) | 59.8 | 32 |
| 6 | A (0.88) | M (0.07) | — | (0.95) | b (0.05) | (0) | 29.9 | 20 |
| 7 | A (0.84) | K (0.06) | — | (0.90) | a (0.10) | (0) | 53.2 | 19 |
| 8 | B (0.78) | L (0.07) | — | (0.85) | f (0.15) | (0) | 74.6 | 22 |
| 9 | A (0.80) | K (0.10) | — | (0.90) | a (0.10) | (0) | 89.2 | 30 |
| 10 | B (0.79) | K (0.13) | — | (0.92) | b (0.08) | (0) | 64.8 | 33 |

*1 Parenthesized figures indicate weight ratio of solid per total solids (e), except that the other additive content is indicated in percentage by weight based on total lubricant coating composition.
*2 Ratio of reaction of epoxy groups in epoxy resin for carboxyl groups in urethane resin.

TABLE 10

Compositions of Examples of the Invention

| | Solids in water-base lubricant coating composition *1 | | | | | | | |
|---|---|---|---|---|---|---|---|---|
| | Resins | | | | | | | |
| Coating No. | Urethane (a) | Epoxy (b) | Other additive | | Lubri. additive (c) | Silica (d) | *2 Ratio of reaction (x) (%) | Film hardness |
| 1 | A (0.82) | K (0.10) | — | (0.92) | a (0.08) | (0) | 80.7 | 21 |
| 2 | A (0.85) | L (0.05) | — | (0.90) | b (0.10) | (0) | 85.7 | 18 |
| 3 | B (0.67) | L (0.13) | — | (0.80) | a (0.20) | (0) | 153 | 28 |
| 4 | B (0.70) | M (0.15) | — | (0.85) | c (0.15) | (0) | 48.6 | 24 |
| 5 | B (0.78) | K (0.12) | — | (0.90) | d (0.10) | (0) | 59.8 | 32 |
| 6 | A | M | — | (0.95) | b | (0) | 29.9 | 20 |

TABLE 10-continued

| Compositions of Examples of the Invention | | | | | | | | |
|---|---|---|---|---|---|---|---|---|
| | Solids in water-base lubricant coating composition *1 | | | | | | | |
| | Resins | | | | | | | |
| Coating No. | Urethane (a) | Epoxy (b) | Other additive | | Lubri. additive (c) | Silica (d) | *2 Ratio of reaction (x) (%) | Film hardness |
| | (0.88) | (0.07) | | | (0.05) | | | |
| 7 | A | K | — | (0.90) | a | (0) | 53.2 | 19 |
| | (0.84) | (0.06) | | | (0.10) | | | |
| 8 | B | L | — | (0.85) | f | (0) | 74.6 | 22 |
| | (0.78) | (0.07) | | | (0.15) | | | |
| 9 | A | K | — | (0.90) | a | (0) | 89.2 | 30 |
| | (0.80) | (0.10) | | | (0.10) | | | |
| 10 | B | K | — | (0.92) | b | (0) | 64.8 | 33 |
| | (0.79) | (0.13) | | | (0.08) | | | |

*1 Parenthesized figures indicate weight ratio of solid per total solids (e), except that the other additive content is indicated in percentage by weight based on total lubricant coating composition.
*2 Ratio of reaction of epoxy groups in epoxy resin for carboxyl groups in urethane resin.

TABLE 12

| | | Coating Composition | | | | | |
|---|---|---|---|---|---|---|---|
| | Chromate adhered | | Amount applied | Coated sheet performance | | | |
| Sample No. | (mg/m$^2$ (Cr)) | Coating No. | ($\mu$m) | Formability | Galling | Chemical resistance | Note |
| 11 | 10 | 1 | 1.5 | A | B | A | Invention |
| 12 | 10 | 2 | 1.5 | A | B | A | |
| 13 | 10 | 3 | 1.5 | B | A | A | |
| 14 | 10 | 4 | 5.0 | A | A | A | |
| 15 | 10 | 5 | 1.5 | A | A | A | |
| 16 | 10 | 6 | 3.0 | A | A | A | |
| 17 | 10 | 7 | 1.5 | A | A | A | |
| 18 | 10 | 8 | 1.5 | B | A | B | |
| 19 | 10 | 9 | 1.5 | A | A | B | |
| 20 | 20 | 10 | 1.5 | A | A | B | |
| 26 | 10 | 16 | 2.0 | D | C | C | Comparative |
| 27 | 10 | 17 | 2.0 | B | C | C | |
| 28 | 10 | 18 | 2.0 | C | D | D | |
| 29 | 10 | 19 | 2.0 | C | D | D | |
| 30 | 10 | 20 | 2.0 | C | C | D | |
| 31 | 10 | 21 | 2.0 | C | C | D | |
| 32 | 10 | 22 | 2.0 | D | D | D | |
| 33 | 10 | 22 | 1.0 | D | D | D | |
| 34 | 10 | 23 | 1.0 | C | C | B | |
| 35 | 10 | 23 | 2.0 | C | B | B | |
| 36 | 10 | 24 | 2.0 | D | B | B | |
| 37 | 10 | 25 | 2.0 | D | D | C | |
| 38 | 20 | 1 | 0.3 | D | D | A | |
| 39 | 3 | 1 | 1.0 | D | D | C | |
| 40 | 120 | 1 | 1.5 | D | D | C | |

As described, the invention makes it possible to use lubricative stainless steel sheets and pipes which can be efficiently formed without the application of a lubricating agent, such as a stamping oil, before the forming and degreasing after the forming.

What is claimed is:

1. A lubricative stainless steel sheet having a chromate film on at least one of the surfaces of a stainless steel sheet substrate, the chromate film having an amount of adhered Cr of 5 to 100 mg/m$^2$, and, on the chromate film, a lubricant film obtained by applying, on the chromate film, a water-base coating containing (a) a urethane resin of ether-ester type having a skeleton of bisphenol type, a skeleton of ester, and a carboxyl group, (b) an epoxy resin, and (c) a polyolefin wax, and baking the applied coating, the sum of the amounts of the urethane resin of (a) and the epoxy resin (b) being 70 to 95% by weight of the total solids of the coating, the amount of the polyolefin wax of (c) being 5 to 30% by weight of the total solids of the coating, wherein the water-base coating for the lubricant film does not contain silica, and the lubricant film having a thickness of 0.5 to 5 micrometers and a Vickers hardness of at least 15.

2. The lubricative stainless steel sheet of claim 1, wherein the urethane resin has a molecular weight of not smaller than 3,000.

3. The lubricative stainless steel sheet of claim 1, wherein the urethane resin has a weight ratio of bisphenol to ester skeletons of 10:90 to 70:30.

4. The lubricative stainless steel sheet of claim 1, wherein the urethane resin is obtained from the polymerization of a polyether polyol having a skeleton of bisphenol A type, a polyester polyol, and a carboxyl-containing compound using an isocyanate compound.

5. The lubricative stainless steel sheet of claim 4, wherein the polyester polyol is a polyester polyol obtained by ring-opening polymerizing a polyester obtained by a dehydration condensation reaction of a glycol with a dibasic acid, or a lactam, in the presence of a glycol.

6. The lubricative stainless steel sheet of claim 4, wherein the isocyanate is selected from the group consisting of monomers, dimers and trimers of aromatic diisocyanates, reaction products of them with a polyether polyol or polyester polyol, and alicyclic isocyanates which are hydrogen-added derivatives of them; reaction products of monomers, dimers and trimers of alicyclic and aliphatic isocyanates with a polyether polyol or polyester polyol; and mixtures thereof.

7. The lubricative stainless steel sheet of claim 4, wherein the isocyanate is used in the amount of 5 to 20% by weight, as calculated as NCO, of the urethane.

8. The lubricative stainless steel sheet of claim 4, wherein the carboxyl-containing compound is selected from compounds having two or more hydroxyl or amino groups and one or more carboxyl groups.

9. The lubricative stainless steel sheet of claim 8, wherein the carboxyl-containing compound is selected from the group consisting of 2,2-dimethylol acetic acid, 2,2-dimethylol propionic acid, 2,2-dimethylol butyric acid, 2,2-dimethylol pentanoic acid, lysine and arginine.

10. The lubricative stainless steel sheet of claim 1, wherein the water-base coating contains the epoxy resin in an amount which effective to cause 20 to 100% of the carboxyl groups of the urethane resin to be reacted.

11. A lubricative stainless steel pipe of the invention having a chromate film on at least one of the outer and inner surfaces of a stainless steel pipe substrate, the chromate film having an amount of adhered Cr of 5 to 100 mg/m$^2$, and, on the chromate film, a lubricant film obtained by applying, on the chromate film, a water-base coating containing (a) a urethane resin of ether-ester type having a skeleton of bisphenol type, a skeleton of ester, and a carboxyl group, (b) an epoxy resin, and (c) a polyolefin wax, and baking the applied coating, the sum of the amounts of the urethane resin of (a) and the epoxy resin of (b) being 70 to 95% by weight of the total solids of the coating, the amount of the polyolefin wax of (c) being 5 to 30% by weight of the total solids of the coating, wherein the water-base coating for the lubricant film does not contain silica, and the lubricant film having a thickness of 0.5 to 5 micrometers and a Vickers hardness of at least 15.

12. The lubricative stainless steel pipe of claim 11, wherein the urethane resin has a molecular weight of not smaller than 3,000.

13. The lubricative stainless steel pipe of claim 11, wherein the urethane resin has a weight ratio of bisphenol to ester skeletons of 10:90 to 70:30.

14. The lubricative stainless steel pipe of claim 11, wherein the urethane resin is obtained from the polymerization of a polyether polyol having a skeleton of bisphenol A type, a polyester polyol, and a carboxyl-containing compound using an isocyanate compound.

15. The lubricative stainless steel pipe of claim 14, wherein the polyester polyol is a polyester polyol obtained by ring-opening polymerizing a polyester obtained by a dehydration condensation reaction of a glycol with a dibasic acid, or a lactam, in the presence of a glycol.

16. The lubricative stainless steel pipe of claim 14, wherein the isocyanate is selected from the group consisting of monomers, dimers and trimers of aromatic diisocyanates, reaction products of them with a polyether polyol or polyester polyol, and alicyclic isocyanates which are hydrogen-added derivatives of them; reaction products of monomers, dimers and trimers of alicyclic and aliphatic isocyanates with a polyether polyol or polyester polyol; and mixtures thereof.

17. The lubricative stainless steel pipe of claim 14, wherein the isocyanate is used in the amount of 5 to 20% by weight, as calculated as NCO, of the urethane.

18. The lubricative stainless steel pipe of claim 14, wherein the carboxyl-containing compound is selected from compounds having two or more hydroxyl or amino groups and one or more carboxyl groups.

19. The lubricative stainless steel pipe of claim 18, wherein the carboxyl-containing compound is selected from the group consisting of 2,2-dimethylol acetic acid, 2,2-dimethylol propionic acid, 2,2-dimethylol butyric acid, 2,2-dimethylol pentanoic acid, lysine and arginine.

20. The lubricative stainless steel pipe of claim 11, wherein the water-base coating contains the epoxy resin in an amount which effective to cause 20 to 100% of the carboxyl groups of the urethane resin to be reacted.

21. A method of producing a lubricative stainless steel pipe, which comprises providing, on only one surface or both surfaces of a stainless steel sheet, a chromate film having an amount of adhered Cr of 5 to 100 mg/m$^2$, subsequently applying, on the chromate film, a water-base coating containing (a) a urethane resin of an ether-ester type having a skeleton of bisphenol type, a skeleton of ester, and a carboxyl group, (b) an epoxy resin, and (c) a polyolefin wax, the sum of the amounts of the urethane resin of (a) and the epoxy resin of (b) being 70 to 95% by weight of the total solids of the coating, and the amount of the polyolefin wax of (c) being 5 to 30% by weight of the total solids of the coating, wherein the water-base coating for the lubricant film does not contain silica, then baking the applied coating to form a lubricant film having a thickness of 0.5 to 5 micrometers and a Vickers Hardness of at least 15, and using the resultant stainless steel sheet provided with the lubricant film to produce an outer-or inner-surface lubricative stainless steel pipe, in the case where the stainless steel sheet having the lubricant film only on one surface, by forming it into a pipe-like shape and sealing the opposed edges thereof to provide a complete pipe, in such a manner that the surface of the sheet provided with the lubricant film is at the outer or inner side of the pipe, or to produce a both-surface lubricative stainless steel pipe, in the case where the stainless steel sheet having the lubricant film on both surfaces, by simply forming it into a pipe-like shape and sealing the opposed edges to provide a complete pipe.

22. The method of claim 21, wherein the urethane resin has a molecular weight of not smaller than 3,000.

23. The method of claim 21, wherein the urethane resin has a weight ratio of bisphenol to ester skeletons of 10:90 to 70:30.

24. The method of claim 21, wherein the urethane resin is obtained from the polymerization of a polyether polyol having a skeleton of bisphenol A type, a polyester polyol, and a carboxyl-containing compound using an isocyanate compound.

25. The method of claim 24, wherein the polyester polyol is a polyester polyol obtained by ring-opening polymerizing a polyester obtained by a dehydration condensation reaction of a glycol with a dibasic acid, or a lactam, in the presence of a glycol.

26. The method of claim 24, wherein the isocyanate is selected from the group consisting of monomers, dimers and trimers of aromatic diisocyanates, reaction products of them with a polyether polyol or polyester polyol, and alicyclic isocyanates which are hydrogen-added derivatives of them; reaction products of monomers, dimers and trimers of alicyclic and aliphatic isocyanates with a polyether polyol or polyester polyol; and mixtures thereof.

27. The method of claim 24, wherein the isocyanate is used in the amount of 5 to 20% by weight, as calculated as NCO, of the urethane.

28. The method of claim 24, wherein the carboxyl-containing compound is selected from compounds having two or more hydroxyl or amino groups and one or more carboxyl groups.

29. The method of claim 28, wherein the carboxyl-containing compound is selected from the group consisting of 2,2-dimethylol acetic acid, 2,2-dimethylol propionic acid, 2,2-dimethylol butyric acid, 2,2-dimethylol pentanoic acid, lysine and arginine.

30. The method of claim 21, wherein the water-base coating contains the epoxy resin in an amount which is effective to cause 20 to 100% of the carboxyl groups of the urethane resin to be reacted.

* * * * *